Patented June 16, 1953

2,642,396

UNITED STATES PATENT OFFICE 2,642,396

HYDROCARBON OIL CONTAINING A MERCAPTOBENZIMIDAZOLE

Thomas C. Roddy, Jr., Port Arthur, Tex., assignor to The Texas Company, New York, N. Y., a corporation of Delaware No Drawing. Application May 1, 1952, Serial No. 285,551

15 Claims. (Cl. 252—47)

This invention relates to a hydrocarbon or mineral oil composition containing a mercaptobenzimidazole stabilizer which is particularly effective in inhibiting corrosion of metals, such as ferrous metals and copper, in contact with the hydrocarbon oil.

This is a continuation-in-part of my copending application Serial No. 96,139, filed May 28, 1949, now abandoned.

One of the principal objects of the present invention is to provide a superior corrosion inhibitor for hydrocarbon oils including gasoline, kerosine, fuel oil, and lubricating oil.

Other objects and advantages of the invention will be apparent from the following description and the appended claims.

The problem of internal corrosion of metal surfaces of vessels, pipes, containers, etc., used in the storage, transportation, handling and utilization of various hydrocarbon oils has long been recognized. With the increasing use of pipe lines to transport such finished petroleum products great distances, the problem has been accentuated. Various inhibitors have been proposed for this purpose, and 2 - mercaptobenzothiazole has achieved substantial commercial use.

The present invention is predicated on the discovery that the reaction product of ortho-phenylene diamine with carbon disulfide constitutes an unusually effective corrosion inhibitor for all of the various hydrocarbon oils. In preparing the effective compound, ortho-phenylene diamine was mixed with carbon disulfide in excess of the stoichiometric requirement and the resulting mixture was allowed to stand at room temperature for a period of the order of 24–48 hours with the noticeable liberation of hydrogen sulfide. The reaction takes place in accordance with the following equation:

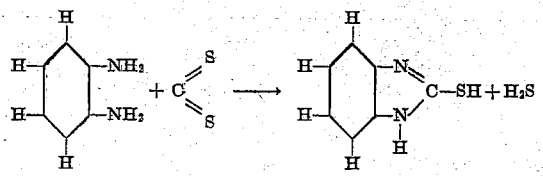

producing mercaptobenzimidazole as the active reaction product (Beilstein, vol. 24, page 119). The mixture was then agitated with aqueous caustic soda to form the sodium salt of mercaptobenzimidazole, which dissolved in the aqueous layer. The solution was filtered to separate unreacted phenylene diamine, which is not caustic soluble. The resulting aqueous filtrate of sodium mercaptobenzimidazole was then acidified with precipitation of the mercaptobenzimidazole, which latter was separated, washed and dried.

The resulting product is a powdery substance of light tan to nearly white color, odorless, having a bitter taste, with a melting point by the capillary tube method of 297° C. and, after recrystallization from alcohol, of 294° C. The product is insoluble in cold water, ethyl ether and dilute hydrochloric acid and shows a positive or slight solubility in hot water, dilute potassium hydroxide, acetone, methyl alcohol, ethyl alcohol and hydrocarbon oils.

In addition to the mercaptobenzimidazole set forth above, the present invention also includes mercapto-alkylbenzimidazoles of the formula

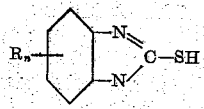

where R is an alkyl radical containing from 1 to 30 carbon atoms, and $n$ is a whole number from 1 to 3 and represents the number of hydrogens on the benzene nucleus which have been substituted by alkyl radicals. It has been found that such a mercapto-alkylbenzimidazole has the said superior anticorrosive properties and also has improved solubility in mineral oils over the unsubstituted mercaptobenzimidazole. As examples of these mercapto-alkylbenzimidazoles, there may be mentioned the compounds in which $R_n$ in the above formula is methyl, ethyl, propyl, butyl, amyl, hexyl, octyl, decyl, dodecyl, cetyl, $C_{12}$ to $C_{30}$ as obtained from cuts or fractions of propylene or butylene polymer, and $C_{20}$ to $C_{30}$ as obtained from paraffin wax; also, the same di-alkyl and tri-alkyl substituted compounds, such as mercapto-diamyl benzimidazole; as well as those containing di- or tri-substituted dissimilar alkyl groups, such as mercapto-methyl octyl, mercapto-butyl dodecyl-, and mercapto-methyl di-t-butyl-benzimidazole. In the preparation of these mercapto-alkyl benzimidazoles, the corresponding alkyl substituted o-phenylene diamine is reacted with carbon disulfide in the manner described above, since mercaptobenzimidazole has been found resistant to direct alkylation.

By way of example, the preparation of a mercapto-mono-t-alkyl benzimidazole, which has been found to be a preferred type of inhibitor, was carried out as follows. In this particular case, the t-alkyl group substituted for a hydrogen atom on the benzene nucleus of mercaptobenzimidazole was a t-amyl group, although it is to be understood that other t-alkyl, secondary alkyl or n-alkyl groups can be substituted in a similar manner to produce effective corrosion inhibitors. Since t-amyl-o-phenylene diamine was not available, this compound was prepared by using t-amyl aniline as a starting material. The latter was nitrated in conventional manner, and p-tertiary amyl ortho nitro aniline was separated from the other isomers obtained in the nitration step. The separated p-tertiary amyl ortho nitro aniline was then reduced by hydrogenation in conventional manner to p-tertiary amyl ortho phenylene diamine. The latter was then mixed with $CS_2$ in excess of the stoichiometric amount, and the mixture allowed to stand at room temperature for 24 hours. The reaction may be represented as follows:

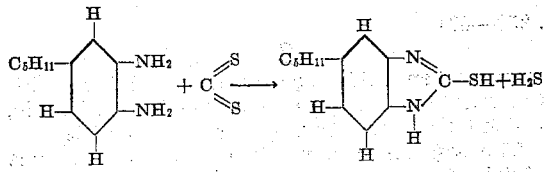

producing 2-mercapto-5t-amylbenzimidazole as the active reaction product. The latter was separated from the reaction mix in the manner described above, namely by agitating with aqueous caustic soda to form the sodium salt, filtering, acidifying the aqueous filtrate, separating the precipitated 2-mercapto-5t-amylbenzimidazole, washing and drying. The resulting compound was a white powdery solid insoluble in water and soluble in mineral oils including gasoline and kerosine, when added in benzene solution, to the extent of at least 10 pounds per 1000 barrels of oil. The resulting petroleum solutions were clear and free from cloud.

As an alternate method of preparation, the mercapto-alkylbenzimidazole may be prepared by alkylating o-phenylene diamine with an aliphatic alcohol in the presence of a suitable Friedel-Crafts catalyst, such as $ZnCl_2$. For example, o-phenylene diamine alkylated with lauryl alcohol in the presence of $ZnCl_2$ gives a mixture of 2-amino-3-lauryl aniline and 2-amino-4-lauryl aniline. The latter compounds, either in admixture or when separated, react with $CS_2$ in the manner set forth above to produce 2-mercapto-4-laurylbenzimidazole and 2-mercapto-5-laurylbenzimidazole. By either alkylating o-phenylene diamine under more stringent conditions, or by first alkylating aniline to provide double or triple alkyl substitution on the benzene nucleus with the ortho-position open and followed by nitration and reduction, intermediates may be prepared which then react with $CS_2$ to produce di- or tri-alkylated mercaptobenzimidazoles.

It has been found that mercaptobenzimidazole or a mercapto-alkylbenzimidazole is more effective as a corrosion inhibitor in various hydrocarbon oils than the best corrosion inhibitors now known and on the market, of which 2-mercaptobenzothiazole and 2,2'-dibenzothiazol disulfide are representative. In addition it has been found that mercaptobenzimidazole is unexpectedly effective as a metal deactivator for the reduction of the copper dish gum in cracked gasoline and is comparable to the leading metal deactivators now on the market, of which disalicylidene diaminopropane is representative. Moreover, the present products are highly effective in very small amounts of the order of 0.1 to 60 pounds per thousand barrels of oil. While mercaptobenzimidazole has limited solubility in the various hydrocarbon oils, the effective range is well within the solubility limits thereof. The mercapto-alkylbenzimidazoles are substantially more oil-soluble. The foregoing properties and advantages of the present products are illustrated in the following tables which set forth the results obtained in actual comparative tests of the present products with the listed compounds in the various hydrocarbon oils enumerated.

The commercial tests generally employed for determining the corrosion inhibiting effect of the inhibitor in hydrocarbon oils are the copper strip corrosion tests at 122° F. and 212° F. respectively. In these tests, a sample of the petroleum oil is heated in contact with a copper strip at the stated temperature for a period of three hours. If any discoloration of the copper strip has occurred at the termination of the test, the same is reported as positive, meaning that the oil is corrosive to copper under the conditions of the test. The discoloration will vary from a light red color for a mildly corrosive stock to a black color for a more highly corrosive oil; and this discoloration may be reported on a numerical basis or corrosion index scale varying from 2 for little if any discoloration to 10 for a black color resulting from a highly corrosive oil. If no appreciable discoloration of the copper strip occurs, the test is reported as negative; and the sample is considered non-corrosive to metals under the conditions of the test. It has been found that certain oils which are non-corrosive to copper in the test at 122° F. may result in objectionable corrosion when transported through pipe lines over long periods of time, or when used in certain metallic equipment where long service life is essential. For this reason, the more rigorous copper strip corrosion test at 212° F. is also employed as a measure of the effectiveness of the inhibitor in oils to provide the required protection for such long service life.

In the following Table I, a Stoddard solvent (kerosine), having typical tests of 48.5° API gravity, 120° F. flash point, and 328–380° F. distillation range was admixed with free sulfur in the proportion of 0.35 gram to 56 liters of the kerosine. Samples of this corrosive stock were then subjected to comparative copper strip corrosion tests at 122° F. and 212° F. with various inhibitors. All tests on the inhibited samples containing from 1 to 20 pounds of inhibitor per thousand barrels of kerosine were negative in the copper strip corrosion test at 122° F. However, the following results, showing differences in the effectiveness of the inhibitors, were obtained in said test at 212° F.:

TABLE I

Stoddard solvent+0.35 g. free sulfur per 56 liters

| Inhibitor | Dosage, lbs. per M barrels | Corrosion-Cu strip at 212° F. | Corrosion Index Scale |
|---|---|---|---|
| None | 0 | Positive | 6½ |
| 2-Mercapto benzothiazole | 1 | ____do____ | 5 |
| Do | 5 | ____do____ | 5 |
| Do | 10 | ____do____ | 5 |
| Do | 20 | ____do____ | 5 |
| 2,2'-dibenzothiazol disulfide | 1 | ____do____ | 5 |
| Do | 5 | ____do____ | 5 |
| Do | 10 | ____do____ | 5 |
| Do | 20 | ____do____ | 5 |
| Mercaptobenzimidazole | 1 | Negative | 2 |
| Do | 5 | ____do____ | 2 |
| Do | 10 | Positive | 2 |
| Do | 20 | ____do____ | 2½ |

The foregoing results show that mercaptobenzimidazole in the very small proportion of 1 pound per thousand barrels is capable of giving a negative result in the rigorous test at 212° F., whereas the other listed inhibitors, which have heretofore been considered to be the best for this purpose, are incapable of preventing copper strip corrosion, even when employed in considerably larger proportions. In this and the following tables dealing with gasolines and kerosines, it should be explained that, while the tables show the mercaptobenzimidazole added in proportions of 10 to 30 pounds per thousand barrels, not all of the added inhibitor went into solution in the light oil in these cases. In fact, a proportion as small as 5 pounds per thousand barrels gave an appreciable sediment of undissolved inhibitor in some cases, thus showing that the inhibitor is highly effective in very minute concentrations.

In the following Table II, a water white kerosine with typical tests of 42.9° API gravity, 136° F. flash point, and 332-512° F. distillation range was employed as the base stock. To this base stock was added sufficient free sulfur to render the kerosine highly corrosive to the copper strip corrosion test at 212° F. Samples of this highly corrosive kerosine were then inhibited with the indicated amounts of the various inhibitors and subjected to comparative copper strip corrosion tests at 212° F. with the following results:

TABLE II

*Water white kerosine+free sulfur*

| Inhibitor | Dosage, lbs. per M bbls. | Corrosion-Cu strip at 212° F. | Color of Strip |
| --- | --- | --- | --- |
| None | 0 | Positive | Black |
| 2-mercapto benzothiazole | 5 | do | Black and Brown |
| Do | 10 | do | Do |
| 2,2'dibenzothiazol disulfide | 5 | do | Do |
| Do | 10 | do | Red and Brown |
| Mercaptobenzimidazole | 5 | do.[1] | Golden |
| Do | 10 | do.[1] | Do |

[1] Strips were borderline with respect to passing this test.

Here again, the mercaptobenzimidazole was highly superior to the other inhibitors in this test.

Another corrosion test which is frequently employed for gasolines is the copper dish corrosion test. The latter is ordinarily conducted in conjunction with the copper dish gum test, which is a measure of the gum stability of the gasoline in storage and of the tendency of the gasoline to deposit gum in fuel systems containing copper. In the copper dish gum test, 100 ml. of the gasoline sample are placed in a highly polished weighed copper dish and the latter is mounted on a steam bath at 99.5-100° C. under a hood with air circulation over the top of the sample until it has evaporated to dryness. Then the dish is placed in an oven and heated at 100-105° C. for about ½-1½ hours until no appreciable further loss in weight occurs. The dish is then cooled in a desiccator and weighed. The increase in weight is reported as milligrams of gum per 100 ml. of sample. It will be noted that this is a catalyzed test and, in conjunction with other tests as discussed hereinbelow, serves to distinguish metal deactivators from antioxidants.

The copper dish corrosion test is run in the same manner except that the appearance of the dish or cup used for the test is observed to indicate the presence in the gasoline of elemental sulfur or corrosive sulfur compounds. A grey to black discoloration of the inside of the dish is reported as positive. Lack of corrosive discoloration is reported as negative. The extent of corrosion may be reported on a numerical scale termed the "estimated corrosion index" in a manner similar to the copper strip corrosion index scale discussed above.

The following results were obtained in comparative tests on a gasoline, which also show the superiority of mercaptobenzimidazole as a corrosion inhibitor. A heavy straight run gasoline having a boiling range of 110-410° F., obtained from a high sulfur crude, was acid treated with 12 pounds per barrel of used alkylation acid (about 88% of $H_2SO_4$) and then doctor sweetened. The resultant gasoline after treatment contained polysulfides and motor fuel blends containing only a small proportion of this uninhibited straight run stock were highly corrosive, producing a very black copper cup when the above described copper dish gum test was made. Tests made on this treated corrosive stock by the above described copper dish corrosion test, with and without the addition of the specified inhibitors in the indicated amounts, gave the following results:

TABLE III

*Heavy straight run gasoline from high sulfur crude*

| Inhibitor | Dosage, lbs. per M bbls. | Cu. Dish Corrosion | Est. Corrosion Index | Apearance of Cup |
| --- | --- | --- | --- | --- |
| None | 0 | Positive | 10 | Black. |
| 2-mercapto benzothiazole | 5 | do | [1] 7-10 | Peacock to black. |
| Do | 10 | do | [1] 7-10 | Do. |
| Do | 20 | do | [1] 7-10 | Do. |
| 2,2' dibenzothiazol disulfide | 5 | do | 8 | Brown with much precipitate. |
| Do | 10 | do | 8 | Brown with some precipitate. |
| Do | 20 | do | 8 | Brown—much improved. |
| Mercaptobenzimidazole | 5 | do | 3 | Golden with white precipitate. |
| Do | 10 | do | 3 | Do. |
| Do | 20 | do | 3 | Do. |

[1] Where plural numbers are assigned, this means the dish was unevenly discolored.

In further explanation of the foregoing table, the copper cups from the samples inhibited with 2-mercaptobenzothiazole were peacock-colored around the upper rim which was only momentarily in contact with the corrosive sample, while by far the larger part of each cup was black. On the other hand, the copper cups from the samples inhibited with mercaptobenzimidazole had no discoloration around the upper rim, while the balance of each cup had only a faint golden discoloration, indicating only slight corrosiveness of the copper by this inhibited gasoline which was initially highly corrosive.

In addition to the lighter distillates, the inhibitors of the present invention are also outstandingly superior as corrosion inhibitors in intermediate and heavy oils, including gas oils, fuel oils and lubricating oils. In the following Table IV, a sweetened diesel fuel, having typical tests of 38.1° API gravity and 410–618° F. distillation range, was selected as the base stock for comparative tests. The uninhibited samples of this diesel fuel were highly corrosive in the copper strip corrosion tests at both 122° F. and 212° F. All of the inhibited samples were negative in the copper strip corrosion test at 122° F. However, the following results were obtained on the inhibited samples in the copper strip corrosion test at 212° F.:

and gear oils. Thus, a commercial cutting oil was selected, having the following composition:

| | Percent by weight |
|---|---|
| Paraffin base lubricating oil S. U. S. vis. at 100° F. of 95–105 | 20.0 |
| Paraffin base lubricating oil S. U. S. vis. at 100° F. 175–185 | 78.3 |
| Sulfurized and chlorinated diisobutylene with of content of 19–22% and Cl S content of 22–25% | 1.5 |
| Lecithin | 0.1 |
| 2-mercapto benzothiazole | 0.1 |

Each of the two viscosity grades of lubricating oil in the above product was produced by distillation, light to moderate acid treating, neutralizing, steaming and brightening. In place of the sulfurized and chlorinated diisobutylene in the above formulation, it will be understood that other known sulfur and chlorine containing additives can be employed, such as sulfo-chlorinated sperm oil or lard oil. In place of the 2-mercaptobenzothiazole in the above formulation, mercaptobenzimidazole was substituted to produce blends containing 0.05% and 0.01% by weight, respectively. However, the higher proportion did not completely dissolve, and the excess or suspended portion of the inhibitor was filtered out so that

TABLE IV

*Sweetened diesel fuel oil*

| Inhibitor | Dosage, lbs. per M bbls. | Corrosion-Cu Strip at 212° F. | Estimated Corrosion Index | Appearance of Strip |
|---|---|---|---|---|
| None | 0 | Positive | 10 | Black. |
| 2-mercaptobenzothiazole | 5 | do | 7 | Reddish Brown. |
| Do | 10 | do | 7 | Do. |
| 2,2' dibenzothiazol disulfide | 5 | do | 7 | Do. |
| Do | 10 | do | 6 | Golden Red. |
| Mercaptobenzimidazole | 5 | do [1] | 2½ | Slight Golden. |
| Do | 10 | do [1] | 2½ | Do. |

[1] After closer examination, the strips were judged satisfactory and passable due to very slight transparent discoloration.

The inhibitor of the present invention is also effective in lubricating oils and compounded lubricating oils, where the specifications require non-corrosiveness in the copper strip corrosion tests. This applies, for example, to cutting oils, premium and heavy duty motor and diesel oils, in the following Table V these samples are reported as containing 0.01+% of the inhibitor. Comparative copper strip corrosion tests at 122° F. and 212° F. on these blended cutting oil samples gave the following results:

TABLE V

*Combined sulfur and chlorine containing cutting oil*

| Inhibitor | Percent by Wt. | Corrosion-Cu Strip | | Corrosion Index | Color |
|---|---|---|---|---|---|
| | | 122° F. | 212° F. | | |
| 2-mercaptobenzothiazole | 0.1 | Neg | | 2 | Bright. |
| Do | 0.1 | | Pos | 8 | Dark Brown. |
| mercaptobenzimidazole | 0.01 | Neg | | 2 | Bright. |
| Do | 0.01 | | Pos | 3 | Slight tarnish. |
| Do | [1] 0.01+ | Neg | | 2 | Bright. |
| Do | [1] 0.01+ | | Pos | 3 | Slight tarnish. |

[1] Limit of solubility somewhere between 0.01 and 0.05%.

Mercaptobenzimidazole has been found to give substantially complete protection against copper strip corrosion by this type of product in the rigorous test at 212° F. The proportion of 0.01% by weight is roughly equivalent to about 30 pounds per thousand barrels; and in products containing a lubricating oil base, the inhibitor is generally employed within a range of about 5-60 pounds per thousand barrels, with about 15-30 pounds per thousand barrels being preferred.

As a further illustration of the effectiveness of the present product as a corrosion inhibitor in a heavier lubricating oil, the following table sets forth the results obtained on a premium type motor oil stock of S. A. E. 20 grade to which was added a small amount of sulfur to render the oil highly corrosive in the copper strip corrosion test at 212° F. The said motor oil stock was prepared from a paraffin base wax distillate by furfural refining, light acid treating, clay contacting and solvent dewaxing.

TABLE VI

*Paraffin base motor oil stock*

| Sample Tested | Corrosion-Cu Strip at 212° F. | Corrosion Index |
| --- | --- | --- |
| (1) Base oil, S. A. E. 20 | Neg | 1 |
| (2) Base oil+10# sulfur/M bbls | Pos | 10 |
| (3) No. (2)+15# mercaptobenzimidazole/M bbls. blended by heating at 140–150° F. for 30 min. | Pos | 5+ |
| (4) No. (2)+15# mercaptobenzimidazole/M bbls. blended at room temp. for 30 min. | Neg | 3 |

As shown by the foregoing table, improved results were obtained by blending the mercaptobenzimidazole in the lubricating oil without heating.

A heavy straight run gasoline from high sulfur crude of the character set forth above in Table III was mixed with a blend of thermally cracked gasolines in the proportion of about 14.7% by volume of the heavy straight run to 85.3% of the thermally cracked gasoline blend. The thermally cracked gasoline blend had typical tests of 90°–382° F. distillation range, with a 50% point of 247° F., API gravity of 59.2, bromine number of 52 and acid heat of 98° F. The resulting blend was sweetened, thereby utilizing the free sulfur in the heavy straight run as a portion of the sulfur for the sweetening step. Samples of the resulting sweetened gasoline blend were then inhibited with a conventional gum inhibitor (antioxidant) and certain of the samples were also provided with a corrosion inhibitor and subjected to ASTM induction period and copper dish corrosion tests as shown in the following table:

TABLE VII

*Blend of heavy S. R. and cracked gasolines*

| Gum Inhibitor | | Corrosion Inhibitor | | ASTM Induction Period, Min. | Cu Dish Corrosion |
| --- | --- | --- | --- | --- | --- |
| Type | Dosage, #/M bbl. | Type | Dosage, #/M bbl. | | |
| No. 1 [1] | 30 | | 0 | 395 | positive—black. |
| Do | 40 | | 0 | 490 | Do. |
| Do | 50 | | 0 | 565 | Do. |
| Do | 30 | 2-mercapto benzothiazole | 5 | 395 | Do. |
| Do | 30 | do | 10 | 360 | Do. |
| Do | 30 | mercaptobenzimidazole | 5 | 420 | negative—golden. |
| Do | 30 | do | 10 | 420 | Do. |

[1] Composition of gum inhibitor No. 1:

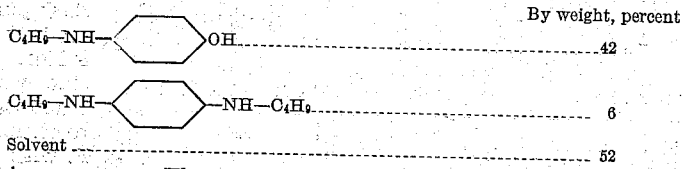

By weight, percent $C_4H_9$—NH—⟨⟩—OH ............................................. 42
$C_4H_9$—NH—⟨⟩—NH—$C_4H_9$ ............................. 6
Solvent ..................................................................... 52

The ASTM induction period test (ASTM Method D525–46) is a determination of the stability of gasoline under accelerated oxidation conditions, and may be used as an indication of the tendency of the gasoline to form gum on storage. In this test a 50 ml. sample is placed in a bomb which is filled with oxygen at 100 pounds per square inch at 15–25° C. The bomb is then placed in a boiling water bath and maintained at 98–102° C. The pressure is read at stated intervals and recorded continuously until the so-called break point is reached. The latter is the point in the pressure-time curve that is preceded by a pressure drop of 2 lbs. per square inch within 15 minutes and succeeded by a drop of not less than 2 pounds per square inch in the following 15 minutes. The induction period is reported as the time in minutes elapsed between the placing of the bomb in the bath and the break point. It will be noted that this is an uncatalyzed test and when conducted on a gasoline sample which is free from dissolved copper or other catalytic metal or metal compound, is a measure of the effectiveness of the so-called gum inhibitors as antioxidants, as opposed to metal deactivators. A substantial increase in the length of the induction period is indicative of a good antioxidant in this test.

From the foregoing Table VII, it will be noted that the blend of heavy straight run and cracked gasoline was highly corrosive in the copper dish corrosion test and that this corrosion could not be controlled by the use of the well known corrosion inhibitor, 2-mercaptobenzothiazole. On the other hand mercaptobenzimidazole was effective in giving a negative result in this corrosion test without interfering with or reducing the effectiveness of the conventional gum inhibitor. In fact, a small increase in ASTM induction period of the order of 30 minutes was observed in the presence of the mercaptobenzimidazole. Tests on the same gasoline blend containing 30 pounds per 1000 barrels of gum inhibitor No. 1 above, together with 2 and 5 pounds per 1000 barrels of the well-known metal deactivator, disalicylidene 1,2-diaminopropane, gave ASTM induction periods of 405 minutes and 415 minutes respectively, thereby indicating the mercaptobenzimidazole to be at least comparable to this known outstanding metal deactivator in this test.

Further tests on blends of sweetened thermally cracked gasolines having the characteristics of those set forth above gave the following results:

TABLE VIII

1ST BLEND OF THERMALLY CRACKED GASOLINES

| Inhibitor | | ASTM Induction Period, Min. | Copper Dish Gum, mg./100 ml. | |
|---|---|---|---|---|
| Type | Dosage, #/M bbl. | | Initial | 1 month |
| None | 0 | 125 | 28 ck. 18 | 116 |
| Gum Inhibitor No. 1 (same as in Table VII) | 10 | 180 | 22 | 82 |
| Do | 30 | 255 | 10 | 49 |
| Gum Inhibitor No. 2 [1] | 10 | 230 | 14 | 25 |
| Do | 30 | 375 | 8 | 13 |
| Metal Deactivator No. 1 [2] | 5 | 120 | 14 | 27 |
| Do | 10 | 115 | 16 | 17 |
| Mercaptobenzimidazole | 10 | 120 | 12 | 29 |
| Do | 30 | 120 | 13 | 28 |

2ND BLEND OF THERMALLY CRACKED GASOLINES

| None | 0 | 125 | 25 | 29 |
|---|---|---|---|---|
| Gum Inhibitor No. 1 | 10 | 210 | 8 | 27 |
| Do | 30 | 340 | 6 | 19 |
| Gum Inhibitor No. 2 | 10 | 300 | 7 | 19 |
| Do | 30 | 340 | 12 | |
| Metal Deactivator No. 1 | 5 | 135 | 10 | 10 |
| Do | 10 | 120 | 12 | 16 |
| Mercaptobenzimidazole | 10 | 120 | 6 | 14 |
| Do | 30 | 120 | 7 | 17 |

[1] Para di-butylphenylenediamine, $C_4H_9-HN-C_6H_4-NH-C_4H_9$.
[2] 80% disalicylidene 1,2-diaminopropane + 20% xylene.

In the foregoing table, the initial copper dish gum test was made on the blends as freshly prepared, and the one month tests were made on the blends after conventional storage for that length of time. The foregoing Table VIII shows that mercaptobenzimidazole is highly effective in reducing the initial copper dish gum and improving the stability of the gasoline on storage. This is quite evident from the tests on the first blend of the table, since that inhibited blend was highly unstable in the presence of metal catalysts as shown by the substantial increase in the one-month copper dish gum over the initial. From these results it appears that mercaptobenzimidazole shows an apparent initial effectiveness as a metal deactivator in addition to functioning as a superior corrosion inhibitor; but on storage for periods of several months or more involving an unsaturated gasoline, this apparent metal deactivating effect is lost and the compound may even function as a gum accelerator.

The following tests show the effectiveness as a corrosion inhibitor for mineral oils of a typical mercaptoalkylbenzimidazole in comparison with conventional inhibitors and also with the unsubstituted mercaptobenzimidazole.

In the following Table IX, a water white kerosine with typical tests of 43.0 API gravity, 125° F. flash point and 335–515° F. distillation range was employed as the base stock. Samples of this particular corrosive kerosine were then inhibited with the indicated amounts of the listed inhibitors and subjected to comparative copper strip corrosion tests at 122° F. and at 212° F. with the following results:

TABLE IX

Water white kerosine

| Inhibitor | Dosage, lbs./M bbl. | Cu Strip Corrosion Index at— | |
|---|---|---|---|
| | | 122° F. | 212° F. |
| None | | 6 | 7 |
| 2-mercapto benzothiazole | 5 | 1 | 5 |
| Do | 10 | 1 | 5 |
| 2,2'-dibenzothiazol disulfide | 5 | 1 | 5 |
| Do | 10 | 1 | 5 |
| Alkyl MBI [1] | 5 | 1 | 1 |
| Do | 10 | 1 | 1 |

[1] 2-mercapto-5t-amylbenzimidazole.

This shows the mercapto-alkyl benzimidazole to be unusually effective in comparison to the conventional inhibitors, since the former completely inhibited corrosion in the test at 212° F., giving a corrosion index rating of 1.

An additional batch of water white kerosine with typical tests of 43.6° API gravity, 129° F. flash point, and 336–516° F. distillation range was made highly corrosive by the addition of free sulfur. Samples of this highly corrosive kerosine were then inhibited with the indicated amounts of the listed inhibitors and subjected to comparative copper strip corrosion tests at 212° F. with the following results:

TABLE X

Water white kerosine + free sulfur

| Inhibitor | Dosage, lbs./M bbl. | Cu Strip Corrosion Index at 212° F. |
|---|---|---|
| None | | 6,7 |
| 2-mercapto benzothiazole | 5 | Pos. |
| Do | 10 | 3 |
| 2,2'-dibenzothiazol-disulfide | 5 | 4 |
| Do | 10 | 6 |
| Alkyl MBI [1] | 1 | 7 |
| Do | 2 | 5 |
| Do | 5 | 3 |
| Do | 10 | 1 |

[1] 2-mercapto-5t-amylbenzimidazole.

In order to test the storage stability of the mercapto-alkylbenzimidazole, samples of a similar water white kerosine containing added free sulfur, together with the indicated amounts of inhibitor, were stored in 5 gallon metal drums for periods of 3, 6 and 12 months. The samples were tested for copper strip corrosion at 212° F. at the end of those periods with the following results:

TABLE XI

Water white kerosine + free sulfur

| Inhibitor | None | Alkyl MBI [1] | | | |
|---|---|---|---|---|---|
| Dosage, lbs./M bbl | 0 | 1 | 2 | 5 | 10 |
| Cu Strip Corrosion Index at 212° F.: | | | | | |
| Initial | 7 | | | | |
| After storage for— | | | | | |
| 3 mo | 7 | 6 | 4 | 2 | 1 |
| 6 mo | 7 | 6 | 6 | Neg. | Neg. |
| 12 mo | 7 | 6 | 6 | 6 | 3 |

[1] 2-mercapto-5t-amylbenzimidazole.

These results show that the inhibitor is slowly depleted in the presence of free sulfur. A dosage of 5 pounds per thousand barrels was sufficient to maintain the base stock satisfactorily.

non-corrosive for a period of six months; while a dosage of 10 pounds per thousand barrels satisfactorily inhibited the corrosive effect for a period of one year. On the other hand, conventional inhibitors are ineffective initially in this test at 212° F. The results show that base stocks, which are highly corrosive due to the presence of free sulfur, can be satisfactorily inhibited against corrosion by the mercapto-alkylbenzimidazole for normal periods of storage and pipe line transportation.

Similar corrosion and storage tests were made on an essentially saturated aviation gasoline containing a mixture of straight run gasoline and alkylate and having a distillation range of 110–320° F. Samples of the gasoline containing the indicated amounts of the listed inhibitors were stored in brown glass bottles over water and iron. Copper strip corrosion tests at 212° F. were made on the fresh samples, and at the ends of the respective storage periods, with the following results:

TABLE XII

*Aviation gasoline*

| Inhibitor | Dosage, lbs./M bbl. | Cu Strip Corrosion Index at 212° F. | | | |
|---|---|---|---|---|---|
| | | Initial | 3 mo. | 6 mo. | 12 mo. |
| None | 0 | 5 | 6 | 7 | 8 |
| 2-mercapto benzothiazole | 1 | 6 | 6 | 6 | 7 |
| Do | 5 | 5 | 5 | 5 | 6 |
| Do | 10 | 4 | 6 | 5 | 4 |
| 2,2′ dibenzothiazol disulfide | 1 | 5 | | 5 | 6 |
| Do | 5 | 5 | 5 | 5 | 6 |
| Do | 10 | 4 | 5 | 6 | 5 |
| Alkyl MBI [1] | 1 | 1 | 6 | 6 | 7 |
| Do | 2 | 1 | 6 | 5 | 4 |
| Do | 5 | 1 | 2 | 1 | 4 |
| Do | 10 | 1 | 2 | 1 | 4 |
| None | 0 | 6 | 6 | 7 | 6 |
| Mercaptobenzimidazole | 0.25 | 2 | 6 | 7 | 6 |
| Do | 1 | 1 | Neg. | 7 | 6 |

[1] 2-mercapto-5t-amylbenzimidazole.

Here again the conventional inhibitors were ineffective initially. On the other hand, both the mercaptobenzimidazole and the mercapto-alkyl-benzimidazole were completely effective initially on this corrosive aviation gasoline which had gone off test. Due to the relative insolubility of the mercaptobenzimidazole in this particular gasoline, a maximum dosage of around 1 lb. per thousand barrels could be added in order to maintain a clear solution. This proved sufficient to satisfactorily inhibit the stock for a period of at least three months, although inhibitor depletion had occurred by the end of six months. The mercapto-alkylbenzimidazole on the other hand maintained a clear solution in the aviation gasoline with a dosage up to 10 lbs. per thousand barrels; and dosages of 5 and 10 lbs. per thousand barrels were completely effective over a period of six months.

The foregoing results on inhibitor depletion on storage represent rather severe cases. It has been found that the inhibitors of the present invention are unusually effective on saturated stocks for the usual periods of storage and transportation. However, in the case of unsaturated stocks, such as cracked gasoline, inhibitor depletion occurs more rapidly; and, for this reason, the mercapto-alkylbenzimidazoles are preferred due to their increased solubility, with resultant increase in permissible dosages to maintain clear solutions, and which at the same time affords longer effective storage periods. In the light distillates, including gasolines and kerosines, the inhibitor of the present invention may be employed in the proportion of about 0.1–30 pounds per thousand barrels, and preferably about 0.5–5 pounds per thousand barrels, depending upon the type of stock and the length of storage or transportation involved. In the heavier hydrocarbon oils, the inhibitor of the present invention may be used within the range from about 0.1 to 60 pounds per thousand barrels, and generally about 10–30 pounds per thousand barrels. As noted above, mercaptobenzimidazole is more soluble in the heavier hydrocarbon oils; while solubility is not a problem with the mercapto-alkylbenzimidazole within the proportion ranges generally employed. The inhibitors of the present invention are universally effective as corrosion inhibitors for the various types of finished hydrocarbon oils which are transported through the products pipe lines.

Obviously many modifications and variations of the invention, as hereinbefore set forth, may be made without departing from the spirit and scope thereof and, therefore, only such limitations should be imposed as are indicated in the appended claims.

I claim:

1. A mineral hydrocarbon oil normally corrosive to metal in the presence of sulfur containing a corrosion inhibiting amount within the range of 0.1 to 60 pounds per thousand barrels of oil of a corrosion inhibitor selected from the group consisting of mercaptobenzimidazole and alkyl substituted derivatives thereof having the formula

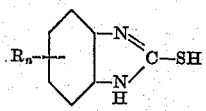

where R represents any alkyl radical containing from 1 to 30 carbon atoms, and $n$ is a whole number from 1 to 3 and represents the number of hydrogen atoms on the benzene nucleus which have been substituted by any alkyl radical or radicals represented by R.

2. A mineral hydrocarbon oil according to claim 1, wherein the corrosion inhibitor is mercaptobenzimidazole.

3. A mineral hydrocarbon oil according to claim 1, wherein the corrosion inhibitor is a mercapto-mono-alkylbenzimidazole.

4. A mineral hydrocarbon oil according to claim 3, wherein the corrosion inhibitor is 2-mercapto-5t-amylbenzimidazole.

5. A light petroleum oil normally corrosive to copper containing 0.1 to 30 pounds per thousand barrels of the light oil of a corrosion inhibitor effective to inhibit said corrosion selected from the group consisting of mercaptobenzimidazole and alkyl substituted derivatives thereof having the formula

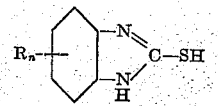

where R represents any alkyl radical containing from 1 to 30 carbon atoms, and $n$ is a whole number from 1 to 3 and represents the number of hydrogen atoms on the benzene nucleus which have been substituted by any alkyl radical or radicals represented by R.

6. A light petroleum oil according to claim 5, wherein the corrosion inhibitor is mercaptobenzimidazole.

7. A light petroleum oil according to claim 5, wherein the corrosion inhibitor is a mercapto-alkylbenzimidazole.

8. A light petroleum oil according to claim 7, wherein the corrosion inhibitor is 2-mercapto-5t-amylbenzimidazole.

9. A gasoline containing 0.1 to 30 pounds per thousand barrels of a corrosion inhibitor selected from the group consisting of mercaptobenzimidazole and alkyl substituted derivatives thereof having the formula

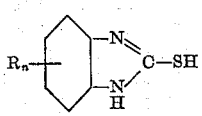

where R represents any alkyl radical containing from 1 to 30 carbon atoms, and $n$ is a whole number from 1 to 3 and represents the number of hydrogen atoms on the benzene nucleus which have been substituted by any alkyl radical or radicals represented by R.

10. A gasoline according to claim 9, wherein the corrosion inhibitor is mercaptobenzimidazole.

11. A gasoline according to claim 9, wherein the corrosion inhibitor is a mercapto-alkylbenzimidazole.

12. A gasoline according to claim 11, wherein the corrosion inhibitor is 2-mercapto-5t-amylbenzimidazole.

13. A diesel fuel comprising a mineral oil distillate within the gas oil range containing mercaptobenzimidazole in an amount within the range of 0.5 pound per thousand barrels up to the limit of solubility of the mercaptobenzimidazole in the oil.

14. A mineral lubricating oil normally corrosive to copper in the copper corrosion test at 122° F. containing a corrosion inhibiting amount of mercaptobenzimidazole within the range of 5-60 pounds per thousand barrels of the oil.

15. A cutting oil comprising as the essential ingredients a mineral lubricating oil in major amount, a sulfur and chlorine containing additive in minor amount effective to improve the cutting properties of said oil, and a small proportion of mercaptobenzimidazole within the range of 5-60 pounds per thousand barrels of oil effective to substantially inhibit said cutting oil against metal corrosion.

THOMAS C. RODDY, Jr.

References Cited in the file of this patent

UNITED STATES PATENTS

| Number | Name | Date |
|---|---|---|
| 1,604,199 | Sebrell | Oct. 26, 1926 |
| 1,933,962 | Bogemann et al. | Nov. 7, 1933 |
| 2,218,283 | Fuller | Oct. 15, 1940 |
| 2,220,970 | Loane et al. | Nov. 12, 1940 |
| 2,382,906 | Pedersen | Aug. 14, 1945 |